Oct. 24, 1933.  B. F. BERRY  1,932,239
CUTTING MACHINE
Filed Dec. 30, 1931
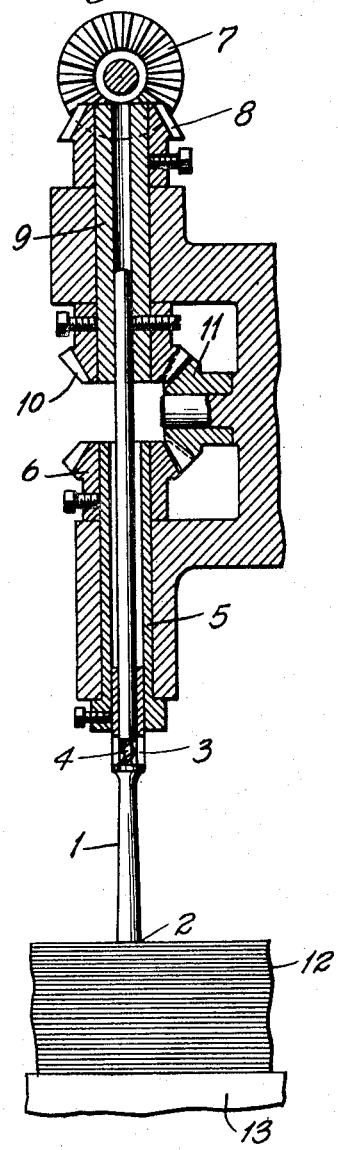
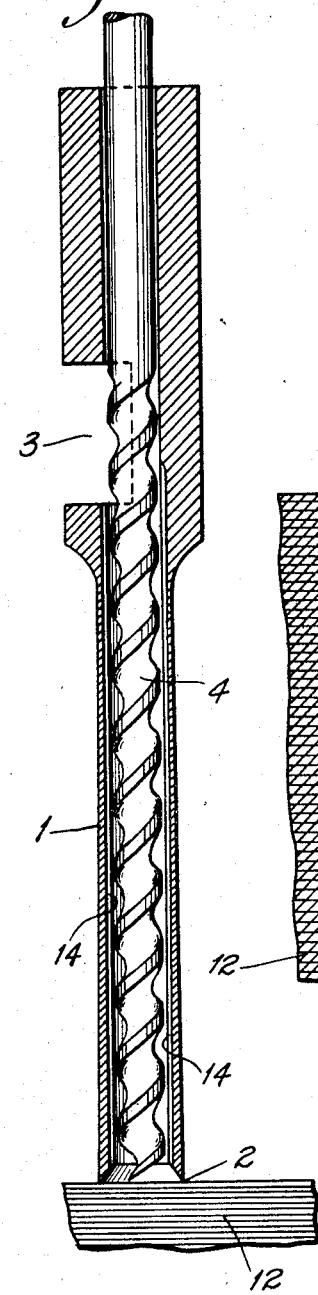
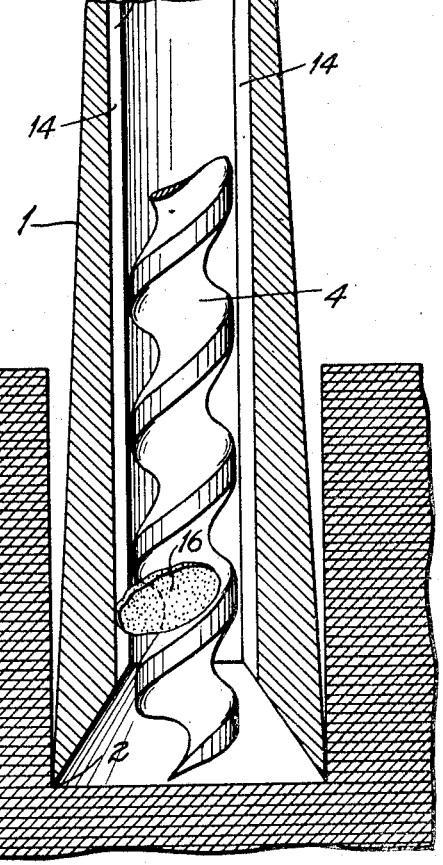
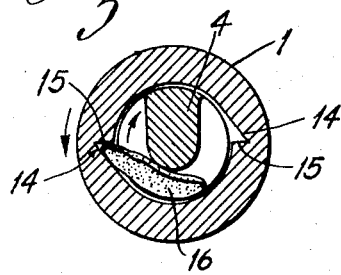
INVENTOR:
B. F. BERRY.
By Albert J. McCauley
ATTORNEY.

Patented Oct. 24, 1933

1,932,239

UNITED STATES PATENT OFFICE 1,932,239

CUTTING MACHINE

Benjamin F. Berry, St. Louis, Mo., assignor to Berry Machine Company, St. Louis, Mo., a corporation of Missouri Application December 30, 1931
Serial No. 583,817

1 Claim. (Cl. 164—124)

This invention relates to cutting machines, and more particularly to a cutter adapted to form round holes in paper and other material.

Prior to the present invention, cutters of this kind, known as round hole cutters, have included a rotary tube having a circular cutting edge at one end, and a spiral extractor rotatably mounted in the tube to transmit the cuttings, or "chips" from the cutting edge to a discharge opening in the tube.

In designing machines of this kind the object has always been to perform the operations at a very high speed without mutilating the work.

However, in actual practice, the operation of the prior machines has been uncertain. Two or more machines of the same design made from the same tools and intended to be exactly alike, do not have an equal degree of efficiency.

One of the old machines may give satisfactory results when operated at a reasonably high speed in perforating some kinds of sheet material, and fail to produce the same results with other material. Another may require a very low speed when operating upon the most favorable material, and absolutely fail to perform satisfactory operations in other material.

In my experience with such machines I have found that the efficiency may be greatly increased or decreased by removing the cutting elements and substituting others that appear to be exactly like the original cutters. This has led to the idea that the solution lies in proper sharpening of the cutting edges, but an investigation extending over many years has shown that an expert mechanic having long experience in this work, while using the same methods of sharpening, will produce cutters having these varying degrees of efficiency.

These old cutting elements appear exactly alike, but some will satisfy the user, while others require a very high degree of pressure at the work which causes objectionable depressions or mutilation of the sheet material at the perforations. In some cases the rotating cutter will not pass through the work unless the pressure at the cutter is great enough to create intense friction which is sometimes great enough to twist and break the cutting element. Moreover, such friction between the cutter and the work results in a very high temperature and involves the danger of igniting the work. In fact it has been deemed unsafe to use such cutters in perforating celluloid and other highly inflammable material.

The old cutters have failed to properly perform their expected functions in many kinds of material, including more or less adhesive substances. This suggests that one objection lies in the friction due to adhesion, but the same cutting element may fail to give satisfactory results in oily material.

This uncertainty in the old machines involves clogging of the tubular cutting elements which are equipped with spiral ejectors to remove the cuttings, and I have employed different forms of ejectors without accomplishing the desired result.

A study of the variations in the work performed by the old cutters that appear exactly alike has convinced me that there must be some accidental variation in the shape, dimensions or surface conditions of the cutters, and that the unknown cause can not be overcome by more accurate finishing of such cutters.

The object of the present invention is to positively eliminate all of this uncertainty, and to produce cutters wherein there is a combination of conditions that positively insure the desired high degree of efficiency in each and every cutter.

More specifically stated, an object is to produce a cutter that will normally operate at the desired high speed without objectionable friction at the tubular cutter. By eliminating this friction at both the inside and outside of the cutter, I eliminate the condition that has heretofore required high pressure and resulted in breakage of cutters, mutilation of the work, and the danger of igniting the work.

In actual practice, I have obtained the desired results by using one of the old type spiral extractors in a tubular cutting element having the usual cutting edge. However, I tapered the outer face of the cutter to prevent undue friction between this outer face and the work, and I grooved the inner face of this tubular cutter so as to form an abutment which transmits the rotary motion of the cutter to the waste material in the spiral extractor.

The new cutters having this combination of conditions accurately form the round holes at high speeds, without overheating or mutilating the work, while operating under a relatively low pressure.

Service tests in perforating oily material, adhesive material and inflammable material, including celluloid, has shown that these new cutters not only eliminate the uncertainties involved in the use of the old cutters, but they enable the machines to safely and accurately perform their functions in various kinds of material that could not be satisfactorily drilled by the old cutters.

With the foregoing and other objects in view, the invention comprises the novel construction, combination and arrangement of parts hereinafter more specifically described and illustrated in the accompanying drawing, wherein is shown the preferred embodiment of the invention. However, it is to be understood that the invention comprehends changes, variations and modifications which come within the scope of the claim hereunto appended.

Fig. 1 is a vertical section illustrating a round hole cutter embodying the features of this invention.

Fig. 2 is an enlarged vertical section showing the tubular cutter and the spiral extractor therein.

Fig. 3 is an exaggerated diagram showing how the tapered outer face of the cutter eliminates the highly objectionable friction between the body of the work and the cutter.

Fig. 4 is a transverse section taken through the cutter and extractor shown in Fig. 3.

To illustrate one form of the invention, I have shown a cutter in the form of a rotary tube 1 having a circular cutting edge 2 at its lower end and a discharge opening 3 near its upper end. A spiral extractor 4 is rotatably mounted in said tube to transmit the cuttings from the cutting edge 2 to the discharge opening 3.

Fig. 1 shows an operating means for rotating the cutter and ejector in opposite directions. The relatively large upper end of the tubular cutter is secured in the lower end of a hollow shaft 5, said shaft being driven through the medium of a gear wheel 6 at its upper end. The operating means also includes a gear wheel 7, at the top of Fig. 1, meshing with a gear wheel 8 on a hollow shaft 9, and a gear wheel 10 at the lower end of said shaft 9 meshing with an intermediate gear 11 through which motion is transmitted to the gear 6.

The hollow shafts 5 and 9 are thus rotated in opposite directions. The cutter 1 is secured to the shaft 5, while the extractor 3 extends through said shaft 5 and is secured to the shaft 9.

12 designates a pile of sheet material arranged on a table 13 below the cutter 1. This table may be lifted by any suitable mechanism while the cutter and extractor are rotating in opposite directions. The cutting edge 2 will then form a circular hole in each sheet of the material 12, and the cuttings, or waste material, will be picked up by the sharp lower end of the spiral extractor and transmitted to the discharge opening 3.

The cutting operation is performed by firmly forcing the sheet material onto the rotating cutting edge 2, thereby forming perforations having circular raw edges, and in some cases numerous small fibers extend from these raw edges.

In other words, when paper is cut in this manner, the holes may appear perfectly smooth and round, but there is more or less tearing of the fibers and sometimes a slight horizontal displacement of the work during the cutting operation. These conditions often result in a high degree of friction between the raw edges of the work and the outer face of the ordinary tubular cutter.

However, the tubular cutter herein shown has a tapered outer face which gradually decreases in diameter from the cutting edge 2, as suggested in Fig. 3, so as to provide a space between the raw edges and said tapered outer face. This condition eliminates the highly objectionable friction which occurs at the outer face of an ordinary straight cutter.

The foregoing is quite important, as the cutter is rotated at a high speed, for example, 1350 revolutions per minute, and if the work firmly engages the outer face of the cutter, the resultant friction will tend to overheat the cutter. Furthermore, such friction would tend to transmit a rotary motion from the cutter to the work, thereby mutilating the raw edges of the perforations in the sheet material, and at the end of the cutting operation a considerable force, and more or less mutilation, would be necessary to remove the work from the outer face of the cutter.

It will now be understood that the tapered outer face of the cutter eliminates a number of the troubles and uncertainties involved in the old machines of this kind.

Another objection to the ordinary old machines lies in the fact that the spiral extractor does not always perform its function. For example, more or less adhesive material may cling to the extractor and merely rotate therewith, instead of rising in the spiral. On the other hand, oily material having no adhesive properties, may slide in a circular course on the smooth inner face of a tubular cutter, instead of rising in the spiral.

The inner face of the tubular cutter herein shown may be grooved, as shown at 14, to provide for the transmission of a rotary motion from the tube to the cuttings in the spiral extractor. The grooves may be of any suitable shape, but to illustrate this feature I have shown longitudinal grooves 14 extending in straight lines from the cutting edge to the discharge opening 3, each of said grooves having an abrupt radial shoulder 15 (Fig. 4) and a tangential face extending from said shoulder to the circular inner face of the tube.

Figures 3 and 4 show how the cuttings 16 enter into the grooves. The tangential face permits the edge of the paper cutting 16 to freely enter and remain in the groove, so as to be firmly engaged by the abrupt radial abutment 15. Consequently, when the tube 1 and extractor 4 rotate in the opposite directions indicated by arrows in Fig. 4, the paper cutting 16 is positively rotated with the tube 1, and for this reason alone it must rise in the spiral. However, the rotary motion of the spiral adds an equal lifting force to the cuttings 16.

Both of these rotary motions tend to force the waste paper cutting 16 onto the abrupt shoulder 15, so the cutting cannot rotate idly with the spiral and it cannot slide around the inner face of the tube 1. Therefore, if we assume that the pitch of the spiral is one-half of an inch, the cutting should rise one-inch in response to each revolution of the tube and spiral, and in actual practice, these elements ordinarily have a speed of about 1350 revolutions per minute.

This involves a very rapid and positive removal of the cuttings. They cannot accumulate or become packed in the tubular cutter, so there is no danger of objectionable friction or breakage within the tube.

By positively eliminating the objectionable conditions at both the inner face and the outer face of the tube, I have completely overcome the uncertainties herein pointed out, and produced a cutter adapted to be regularly operated at the desired high speed without mutilating the work.

I claim:

A cutter comprising a rotary tube having a circular cutting edge at one end and a discharge opening between its ends, a spiral extractor rotatably mounted in said tube to transmit the cuttings from said cutting edge to said discharge opening, and operating means whereby said tube and extractor are rotated in opposite directions, the inner face of said tube being provided with abrupt shoulders arranged longitudinally of the tube to positively transmit rotary motion from the tube to the cuttings in said spiral extractor, and the outer face of said tube being tapered so as to gradually decrease in diameter from said cutting edge and thereby provide a tapering annular space between the outer face of the tube and raw edges of the material cut by said edge.

BENJAMIN F. BERRY.